(12) United States Patent
McVicker et al.

(10) Patent No.: US 10,493,384 B2
(45) Date of Patent: Dec. 3, 2019

(54) FILTRATION SYSTEM

(71) Applicant: Asama Coldwater Manufacturing Inc., Coldwater, MI (US)

(72) Inventors: Kevin McVicker, Coldwater, MI (US); Tyler Hemker, Coldwater, MI (US)

(73) Assignee: Asama Coldwater Manufacturing Inc., Coldwater, MI (US)

(*) Notice: Subject to any disclaimer, the term of this patent is extended or adjusted under 35 U.S.C. 154(b) by 466 days.

(21) Appl. No.: 14/669,346

(22) Filed: Mar. 26, 2015

(65) Prior Publication Data

US 2016/0144296 A1 May 26, 2016

Related U.S. Application Data

(60) Provisional application No. 61/971,267, filed on Mar. 27, 2014.

(51) Int. Cl.
*B01D 24/02* (2006.01)
*B01D 39/06* (2006.01)
*B01D 24/16* (2006.01)
*C10M 175/00* (2006.01)

(52) U.S. Cl.
CPC .......... *B01D 24/02* (2013.01); *B01D 24/165* (2013.01); *B01D 39/06* (2013.01); *C10M 175/0058* (2013.01)

(58) Field of Classification Search
None
See application file for complete search history.

(56) References Cited

U.S. PATENT DOCUMENTS

| 2,578,360 | A | | 3/1949 | Jubenville | |
|---|---|---|---|---|---|
| 3,455,457 | A | * | 7/1969 | Popelar | B01D 21/0012 210/167.04 |
| 3,558,482 | A | * | 1/1971 | De Young | B01D 17/0202 210/708 |
| 3,844,743 | A | * | 10/1974 | Jones | B01D 17/0202 96/184 |
| 3,845,971 | A | | 11/1974 | Hamilton | |
| 3,897,335 | A | | 7/1975 | Brandt | |
| 4,213,600 | A | * | 7/1980 | Thompson, Jr. | C22B 3/46 210/266 |
| 4,277,280 | A | | 7/1981 | Montgrain | |
| 4,389,247 | A | * | 6/1983 | Won | C22B 5/12 266/171 |
| 4,751,006 | A | * | 6/1988 | Becker | B01D 21/009 210/774 |

(Continued)

FOREIGN PATENT DOCUMENTS

| JP | 09262592 A | * | 10/1997 |
| JP | 09262592 A | * | 10/1997 |
| WO | WO99/16527 | | 4/1999 |

*Primary Examiner* — Robert J Popovics
(74) *Attorney, Agent, or Firm* — Varnum, Riddering, Schmidt & Howlett LLP

(57) ABSTRACT

A filtration system includes a bin having a base, an inlet configured to receive contaminated fluid, and an outlet. The bin further includes a plurality of metal chips positioned on a plate, such as a perforated plate, above the base of the bin. The contaminated fluid, such as contaminated coolant, may flow through the inlet toward the base of the bin and pass up through the plate and the chips to filter away contaminations.

6 Claims, 8 Drawing Sheets

(56) References Cited

U.S. PATENT DOCUMENTS

| | | | | |
|---|---|---|---|---|
| 5,167,839 | A * | 12/1992 | Widmer, II | B01D 21/2455 198/716 |
| 5,230,793 | A * | 7/1993 | Lenhart | B01D 35/12 184/6.24 |
| 5,380,446 | A * | 1/1995 | Bratten | B01D 37/00 184/6.24 |
| 5,417,849 | A * | 5/1995 | McEwen | B01D 33/073 210/109 |
| 5,466,380 | A * | 11/1995 | Bratten | B01D 37/00 137/399 |
| 5,593,596 | A * | 1/1997 | Bratten | B01D 37/00 137/399 |
| 5,603,846 | A * | 2/1997 | Uchiyama | B01D 33/073 210/784 |
| 5,800,104 | A * | 9/1998 | Miyano | B01D 21/32 210/167.02 |
| 5,858,218 | A * | 1/1999 | Setlock | B01D 29/014 210/167.01 |
| 5,983,910 | A * | 11/1999 | Berger | B01D 21/2461 134/104.2 |
| 6,017,446 | A * | 1/2000 | Harms | B23Q 11/1069 184/6.14 |
| 6,096,198 | A * | 8/2000 | Underhill | B01D 17/0202 210/123 |
| 6,110,386 | A * | 8/2000 | Underhill | B01D 17/0202 210/167.02 |
| 6,123,606 | A | 9/2000 | Hill | |
| 6,235,209 | B1 * | 5/2001 | Bratten | B01D 29/15 210/167.09 |
| 6,332,983 | B1 * | 12/2001 | Tashiro | B23Q 11/0057 210/295 |
| 6,911,142 | B2 * | 6/2005 | Pahl | B01D 37/04 210/104 |
| 7,172,689 | B2 * | 2/2007 | Bratten | B23Q 11/0057 137/484.2 |
| 7,258,784 | B2 * | 8/2007 | O'Ryan | B01D 39/1661 210/108 |
| 7,338,606 | B2 * | 3/2008 | Bratten | B23Q 11/0057 137/484.2 |
| 7,410,569 | B1 * | 8/2008 | Tilev | B01D 21/0012 210/167.02 |
| 7,416,667 | B2 * | 8/2008 | Benachenou | B01D 17/0208 210/285 |
| 7,635,435 | B2 * | 12/2009 | Benachenhou | B01D 17/0202 210/741 |
| 7,976,704 | B2 * | 7/2011 | Tashiro | B01D 35/06 210/222 |
| 8,501,017 | B2 | 8/2013 | Urban | |
| 8,721,895 | B2 * | 5/2014 | Benachenou | B01D 17/0208 210/661 |
| 9,393,571 | B2 * | 7/2016 | Hori | B03C 1/30 |
| 2004/0112823 | A1 * | 6/2004 | Benachenou | B01D 17/0208 210/285 |
| 2004/0251216 | A1 * | 12/2004 | O'Ryan | B01D 39/1661 210/767 |
| 2006/0231510 | A1 * | 10/2006 | Benachenhou | B01D 17/0202 210/799 |
| 2007/0007216 | A1 * | 1/2007 | Bratten | B23Q 11/0057 210/741 |
| 2008/0093285 | A1 * | 4/2008 | Tashiro | B01D 35/06 210/223 |
| 2009/0218268 | A1 | 9/2009 | Tashiro | |
| 2014/0054208 | A1 * | 2/2014 | Vestergaard Frandsen | B01D 61/18 210/136 |
| 2016/0144296 | A1 * | 5/2016 | McVicker | B01D 24/165 210/807 |

* cited by examiner

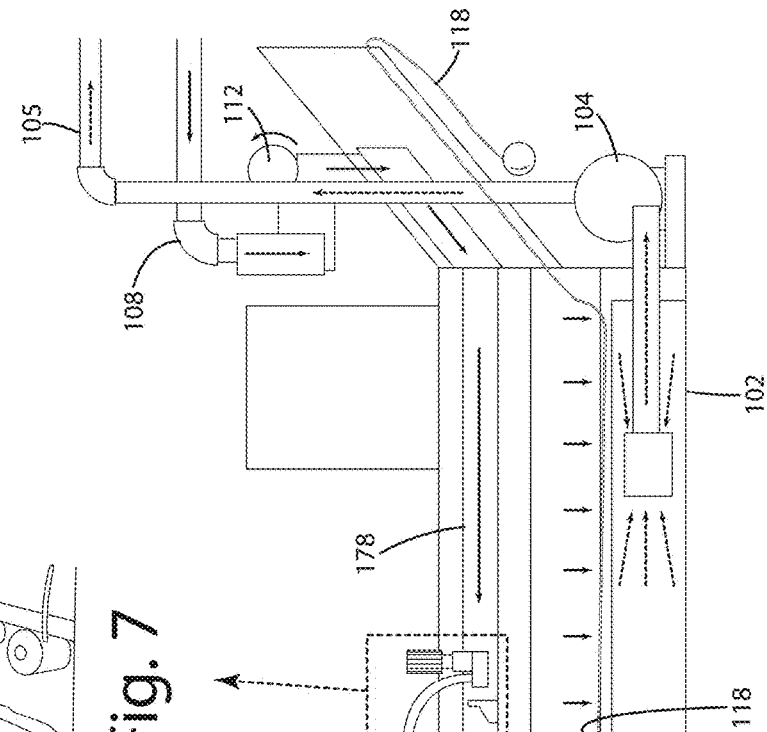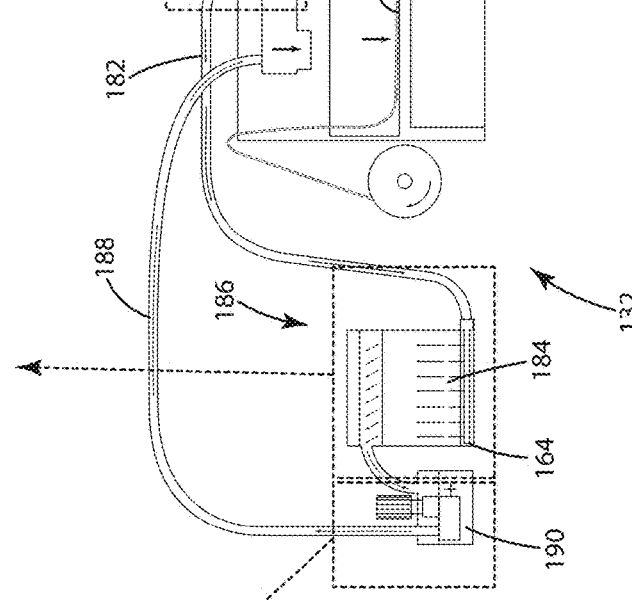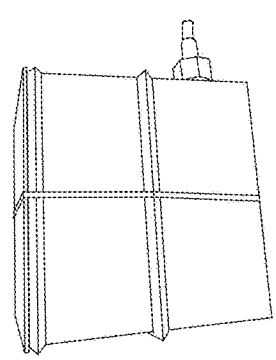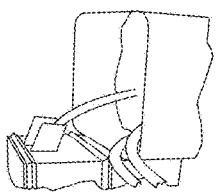

FILTRATION SYSTEM

CROSS-REFERENCE TO RELATED APPLICATIONS

The present application claims priority to U.S. Provisional Patent Application No. 61/971,267 filed on Mar. 7, 2014 and entitled "IMPROVED FILTRATION SYSTEM," the contents of which are hereby incorporated in their entirety.

FIELD OF INVENTION

The invention relates to filtration systems and, more particularly, to improvements with respect to coolant filtration media and processes.

BACKGROUND

Coolant filtration systems and methods for use thereof are well known in the metalworking industry. An example of a filtration system for one type of metalworking machine is disclosed in Urban, U.S. Pat. No. 8,501,017, issued Aug. 6, 2013. The Urban system includes a housing, pump, conveyor assembly, drum assembly and centrifugal separator. The housing includes a tank for receiving and holding coolant coming out of one or more of the metalworking machines. The pump is used to drive the coolant through the coolant filtration system. One part of the conveyor assembly is disposed within a housing in order to carry away workpiece chips from the coolant. The drum assembly is located near the conveyor assembly, for purposes of filtering the coolant. The centrifugal separator receives coolant processed by the conveyor and drum assemblies. Filters are provided for additional filtering of the coolant which is output from the centrifugal separator.

Another process and apparatus for treating liquid coolant is disclosed in Brandt, U.S. Pat. No. 3,897,335, issued Jul. 29, 1975. The Brandt patent discloses a continuous process for bleeding off a portion of a clean aqueous based coolant containing water, oil and additives from a central cooling system. The bleed-off is made into a heated and substantially quiescent pool for purposes of killing bacteria. The heat also breaks out mechanically emulsified tramp oil from the coolant, which is then skimmed off. The heat also frees some of the solid contaminants for removal, and essentially "tightens" the chemically emulsified oils. The result of substantially sterilized and cleaned coolant is then returned to the central cooling system.

Brandt also discloses the use of a bypass valve in an output duct from the return pump for the cooling system. A heat exchanger is used with the bypassed coolant, and a settling tank is also provided, where the heater is located. A skimmer is also provided for the separated tramp oil and flotsam from the tank. The tank can also include a bottom scraper for heavier fine particles or solid contaminants that may settle in the tank. From the settling tank, the clean and sterilized coolant can be pumped to a clean tank. Alternatively, the coolant can then be pumped to a mixer for make-up materials before passing through the heat exchanger and being returned to the coolant system. Other grinding apparatus deploying cooling systems are disclosed in European Patent Application 2,578,360 and U.S. Pat. No. 6,123,606.

Referring more specifically to background related to the current invention, the coolant which is used to cool a tool and/or workpiece in a machining operation (such as grinding) becomes contaminated with metallic particles which are commonly referred to as "swarf." The swarf comprises metallic particles specifically removed by the tool/grinder and the abrasive fragments which may have come from the tool/grinder itself. The used coolant needs to be filtered before it can be recycled in the operation or, alternatively, discarded.

As known in the industry, after the used coolant has passed through a magnetic separator for purposes of removing larger metallic particulate, the coolant is passed directly through a paper filtration system which is then used to remove the non-magnetic particulate and to achieve what is known in the industry as a required 10 um filtration. In this operation, the dirty coolant is pulled through a paper media with a pump. This process produces a "cake" which is formed at the layer of built up "swarf" or "grinding fines" on the paper. The coolant, after being pulled through the paper media, is recycled in the operation or discarded. Typically, the paper media (with the cake) is discarded into a landfill.

A partially schematic diagram of a prior art system utilizing a coolant filtration process is illustrated in FIG. 1. The system is identified as system 100. The system 100 includes what is shown on the left side of the diagram as a clean tank 102. The clean coolant is pulled from the clean tank 102 through the use of a pump 104. The pump 104 is utilized to feed the coolant to grinding stones through pipes 105, which are typically of a size having a three-inch diameter. The coolant is fed to the pad grinder 106 where a conventional pad grinding operation may be continuously executed. During the pad grinding operation, the coolant is used to carry away grinding swarf of cast iron and CBN. The dirty coolant then flows back through a pipe 108, with the coolant fed through a pump pack pump 110. The pipe 108 leads the dirty coolant to a magnetic separator 112. The magnetic separator 112 is utilized to remove approximately 50 percent of the grinding swarf.

Following the magnetic separation process carried out through the separator 112, the coolant then flows through a trough 114 to what is characterized as a dirty tank 116. When the coolant is in the dirty tank 116, the same is pulled through the paper media 118. With the coolant fluid flowing through the paper media 118, a cake of grinding swarf is formed on the paper 118.

With this process, the paper media will reach a point where it cannot pull a sufficient amount of coolant through the media 118. When this threshold occurs, an indexer 120 is utilized to index the paper media 118 within the dirty tank 116 to a clean section of paper 118. The dirty paper is then applied to a collector 122 and sent to a landfill or the like for disposition.

With a system such as described above, several concerns arise. First, a safety issue arises in that the caked and dirty paper is relatively heavy and difficult to remove from the machine. Also, quality issues arise in that the paper media 118 allows some of the swarf to pass through the system. This swarf can readily cause damage to locators and cause relatively shortened tool life.

Still further, costs present principal concerns. In a conventional operation, the yearly cost of paper media may exceed $200,000. Costs for using landfill are often in the range of approximately $5,000. In addition, if damage is caused to pumps and the like, rebuilding costs can be significant. A sample supply pump rebuild can be in the order of $6,000 or more.

Environmental concerns exist with respect to dirt which results from handling of the used, caked paper media and from splatter from the paper. In addition, concerns exist with respect to damage to the environment as a result of the caked, dirty paper going into the landfill. In addition, with respect to system delivery and up time, the prior art system requires substantial maintenance with respect to fluid replacement and the like. Also, down time of the grinders results in significant production loss.

SUMMARY OF THE INVENTION

A filtration system is generally presented. The filtration system includes a bin having a base, an inlet configured to receive contaminated fluid, and an outlet. The bin may further include a plurality of metal chips. The metal chips may be positioned on a plate, such as a perforated plate, above the base of the bin. The contaminated fluid, such as contaminated coolant, may flow through the inlet toward the base of the bin and may pass up through the plate and the chips to filter away contaminations.

In an embodiment, the filtration system includes a baffle and an upper wall located near the inlet. The baffle and upper wall may be configured to separate a volume near the inlet and prevent liquid outside of the volume from interacting with liquid inside the volume. The baffle and upper wall may create a dead zone and allow contaminated liquid to flow toward the bottom of the bin, then flow upward through the plate and plurality of metal chips.

In an embodiment, a coolant filtration system comprises a grinder assembly and a paper media filtration system. The system includes a clean tank through which clean coolant is pulled by means of a pump and transferred to the grinding assembly through pipes. A pump is provided for moving resultant dirty coolant from the grinding assembly to a magnetic separator, which removes a substantial part of grinding swarf existing within the coolant. A trough is provided, with the coolant flowing through the trough to a dirty tank, and then pulled through paper media. The flow of the coolant fluid through the paper media causes a cake of grinding swarf to be formed on the paper. Means are provided for determining when the paper media has reached a threshold such that it cannot officially pull a sufficient amount of coolant through the paper. An indexer is formed so as to index the paper to a new, clean section.

In accordance with principal aspects of the invention, after the dirty or used coolant is passed through the magnetic separator so as to remove relatively larger metallic particulate, a filtration system is provided having beds of machining chips. The dirty coolant, after passing through the separator, is delivered to one of a series of bins. A baffle is provided for each bin, with the baffle surrounding an inlet of the piping to the bin. The baffle essentially creates a dead zone, and operates as a distribution manifold. The baffle is open at the bottom to a remainder of the bin. The bin is a perforated plate mounted adjacent the bottom of the bin. The plate supports a bed of metal turnings or chips from the metalworking operation. The dirty coolant outflows through the bed of chips, and is cleaned of swarf as it passes through the bed, resulting from the metallic attraction between the swarf and the turnings or chips. The cleaned coolant outflowing from the top of the bed is then transferred to the clean tank, and added back into the fluid which will be recycled in the filtration system.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention, and are not to be construed as limiting the invention. In the drawings:

FIG. 4 is a partial schematic diagram of a second and preferred embodiment of a filtration system in accordance with the invention, with FIG. 4 specifically illustrating the use of a dirty coolant tank having a dam with a chip bed;

FIG. 5 is a photograph of the section of the system where the coolant is pumped back to the dirty side of the paper media tank;

FIG. 6 is a photograph of the outside of the filter hopper and clean tank;

FIG. 7 is a photograph of the pump pulling dirty coolant in a return trough from the magnetic separator;

DETAILED DESCRIPTION OF THE INVENTION

The principles of the invention are disclosed, by way of example, in an improved grinder system 130 and a second embodiment of an improved grinder system 132, both systems being in accordance with the invention. The grinder system 130 is primarily illustrated in FIG. 2, while the grinder system 132 is illustrated in FIG. 4. In addition, various aspects associated with the grinder systems 130, 132 are illustrated in the photographs of FIGS. 5-30.

Figure 1:
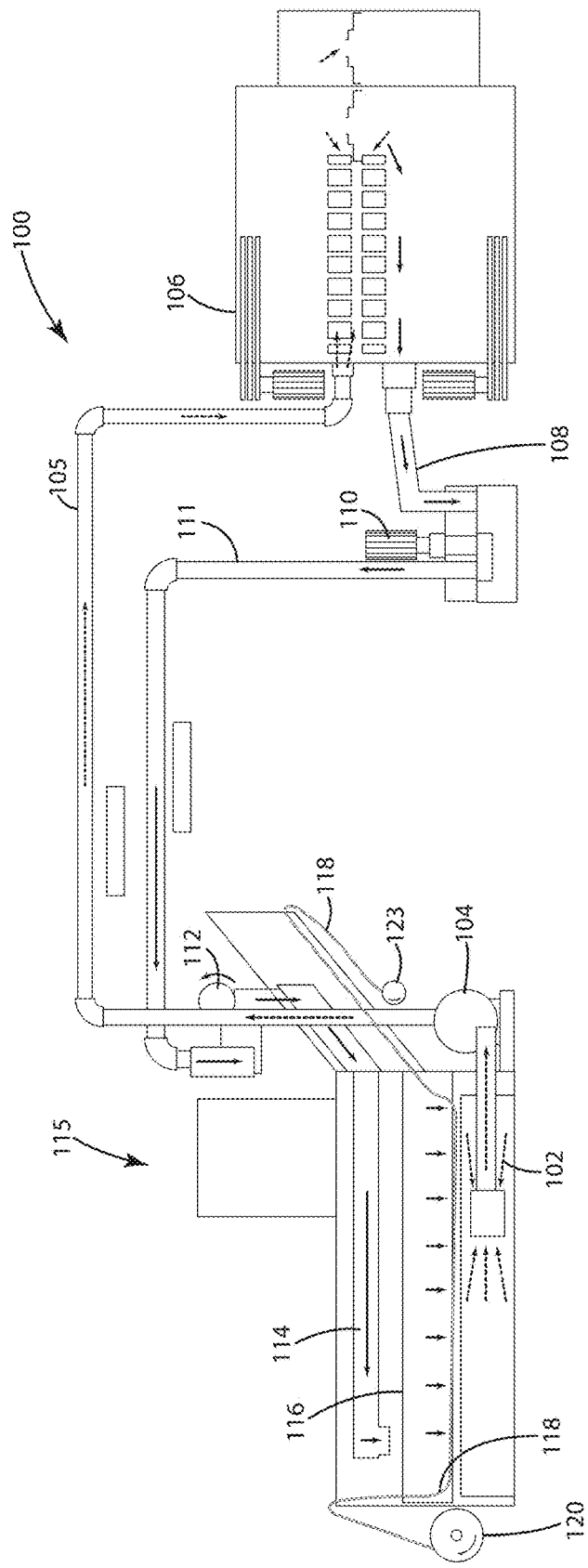
FIG. 1 is a partially schematic diagram of a prior art grinder coolant filtration system.
Figure 2:
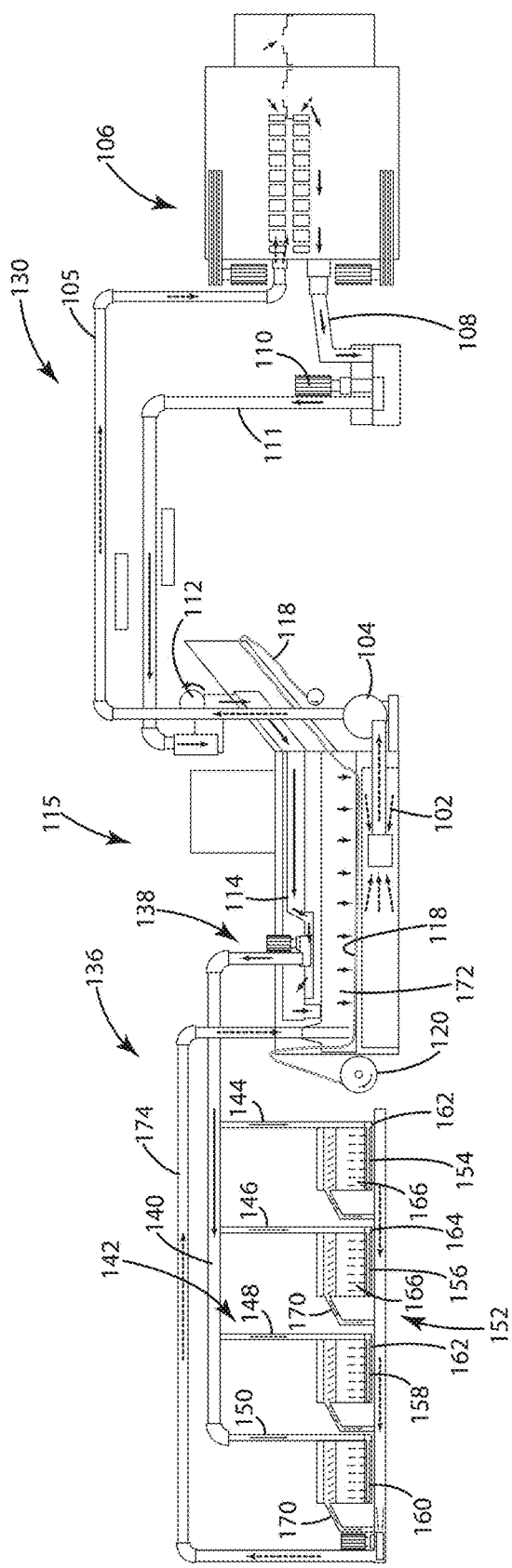
FIG. 2 is a partially schematic diagram of a first embodiment of a filtration system in accordance with the invention.

Referring first to FIG. 2 and the grinder system 130, elements of the grinder system 130 which are similar in structure and function to those of the grinder system 100 will have like numerical references.

In this regard, the grinder system 130 includes a grinding assembly 106 which receives coolant from the pipe 105. The system 130 further includes the pipe 108 for return of dirty coolant from the grinder assembly 106. A pump pack pump 110 is utilized to move the coolant along the pipe 108, and through the dirty coolant return pipe 111. The magnetic separator 112 is then utilized to remove a substantial percentage of the grinding swarf from the coolant. After processing through the magnetic separator 112, the coolant is supplied through a trough 114. However, unlike the prior art, after the coolant has been passed through the magnetic separator 112, and as illustrated in FIG. 2, processing of the coolant occurs through the use of a chip hopper system 136. Specifically, the chip hopper system includes a pull pump 138 which pulls the coolant in the return trough 114 into the hopper system 136. More specifically, the pull pump 138 is coupled to a main pipe 140 to a series of branching pipes 142.

Figure 11:
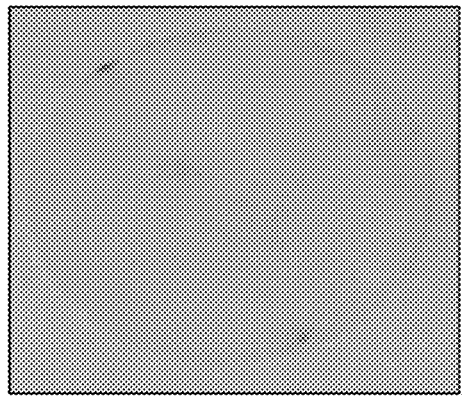
FIG. 11 is a dirt load comparison analysis showing dirt load following the prior art paper media process, while FIG. 11 also shows the cleaner coolant load following the chip filtration process in accordance with the invention.

In the particular embodiment shown in FIG. 2, the branching pipes 142 comprise a series of four individual pipes, identified as branching pipes 144, 146, 148 and 150, respectively. The branching pipes 142 each direct coolant to the underside of an individual chip hopper 152. In the embodiment shown in FIG. 2, the chip hoppers 152 consist of four individual hoppers, identified as chip hoppers 154, 156, 158 and 160. In this configuration, the main pipe 140 can be characterized as a distribution header 140. The branching pipes 142 can be characterized as applying the dirty coolant to one of a series of four bins, comprising each of the chip hoppers. Each bin 162 includes a baffle 164 which surrounds the inlet of the individual branching pipes 142. Each of the baffles 164 is designed so as to create what is characterized as a "dead zone." That is, the baffles 164 each operate as a distribution manifold, and are open at the bottom to the remainders of the bins 162. Each of the bins 162 preferably has a perforated plate 166 which can be mounted to an angle iron bracing spaced a predetermined distance from the bottom of each of the corresponding bins 162. The perforated plates 166 each extend across the entire bottom of the corresponding bin 162, except for an area near the inlet where the baffle is located. The edges of the perforated plate 162 are sealed with materials such as commercially available caulk-type sealant. The edges are sealed where they meet and rest upon the angle iron. Each of the perforated plates 166 can support a bed of metal turnings or "chips" from the metalworking operations. The dirty coolant is caused to up flow through each bin. As the dirty coolant passes through the bins, the coolant is cleaned of swarf, resulting from the attraction between the swarf and the turnings or chips 168. This clean coolant up flowing from the top of the bed is then piped (and can flow by gravity means) through gravity pipes 170 to a "clean tank" 172 through header pipe 174. When piped to the clean tank 172, the cleaned coolant is then added back into the tank of coolant fluid which will be recycled in the paper media filtration system previously described with respect to prior art systems. The paper filtration system can operate in the grind system 130 in accordance with the invention in substantially the same manner as it operates in the prior art systems. However, with the features added to the entirety of the system in accordance with the invention, the resultant coolant will be contaminant free or at least 90 percent free of any contaminants greater than one micron, versus conventional paper media filtering that yields a much higher contaminant percentage, as shown in FIG. 11.

Figure 3:
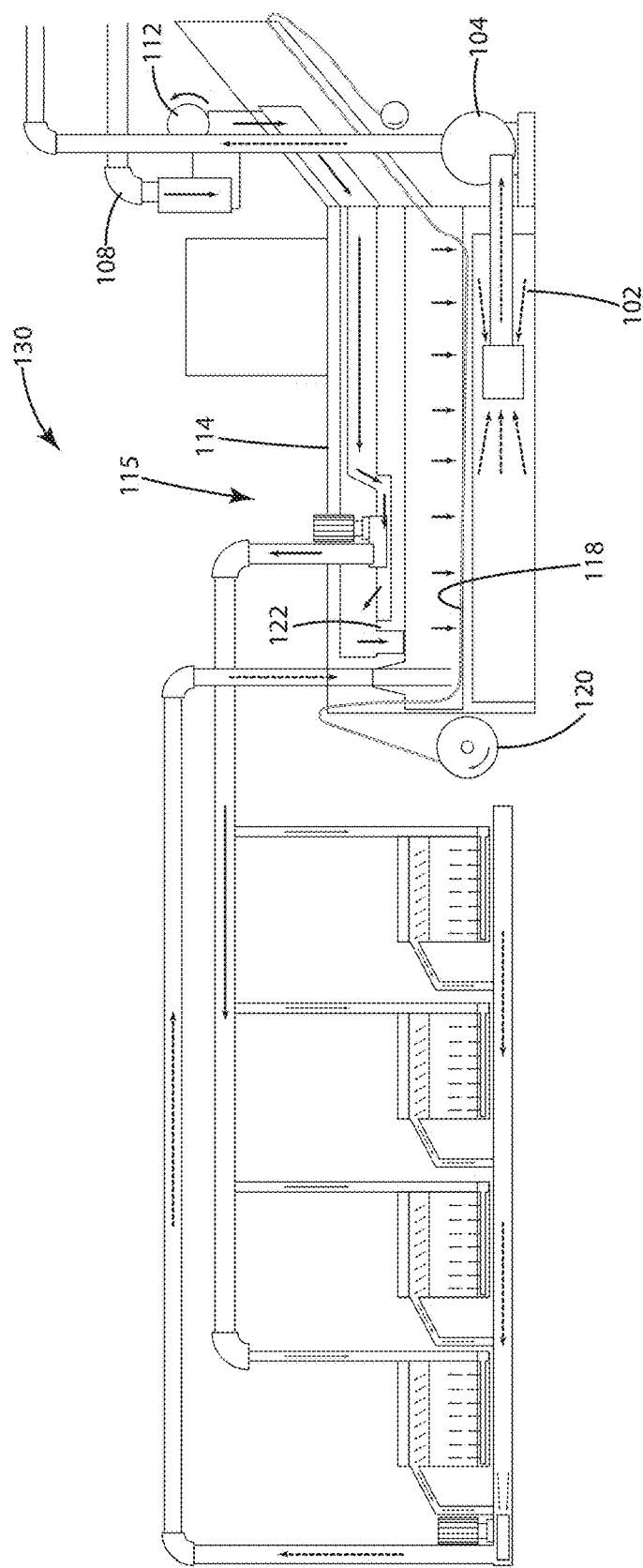
FIG. 3 is a partial schematic diagram of the part of the system shown in FIG. 2 comprising a four-chip hopper system and the coolant tank's filtration system, with the grinding assembly, which is shown in FIG. 2, being removed from FIG. 3.

It will be apparent from the foregoing description and FIG. 2 that the grinder system 130 can advantageously be scaled as required by the user. For example, scaling can occur by adding additional bins 162. FIG. 3 is a somewhat enlarged view of the chip hopper system 136 and the magnetic separator and paper media filtration system 112, and the paper filtration system 115. What is not shown in FIG. 3 is the grinding assembly itself.

A preferred embodiment of a system in accordance with the invention is shown in FIG. 4 as the grinder system 132.

As with FIG. 3, the actual grinder assembly of the system 132 has been omitted from FIG. 4. In FIG. 4, the dirty coolant passes through the magnetic separator 112 and then flows into a dirty coolant tank 178. The dirty coolant tank 178 includes a "dam" 180, which causes flow of the dirty coolant to be anywhere from 20 percent to 95 or even 100 percent of the total dirty coolant. This coolant can be applied for filtering to the chip bed 184 of the bin 186. It should be noted in reviewing FIG. 4 that although the inlet to the bin 186 appears to be adjacent the bottom of the bin, the inlet actually exists adjacent the upper portion of the baffle 164. In accordance with the particular embodiment 132, after flowing out of the bin 186 with the chips, the clean coolant is actually pumped back to the "dirty" tank 178. However, the entry to the dirty tank 178 (through coolant pipe 188 and pump 190), causes the coolant to enter the dirty tank on the opposing side of the dam 180. That is, the coolant enters on the "cleaner side" of the dirty tank 178. This chip filtered coolant (together with some unfiltered coolant which may, for example, flow over the dam 180) is then essentially forcedly applied by a pump through the paper media in the traditional fashion previously described with respect to the prior art.

In association with FIG. 4, various features of the grinding system 132 are also shown in FIGS. 5, 6 and 7. Specifically, FIG. 5 illustrates the coolant being pumped back to the dirty side of the paper media tank. FIG. 6 illustrates the outside of the chip hopper. FIG. 7 illustrates the pump pulling dirty coolant in the return trough from the magnetic separator 112.

Other embodiments can be developed for grinding systems, without departing from the spirit and scope of the novel concepts of the invention. For example, in one embodiment of the invention, the "middle part" of the system, comprising the paper filtration system, can be eliminated. That is, filtration would only occur by the beds of metallic turnings or chips. In still another embodiment, instead of employing a perforation plate at the bottom of the bin supporting the chip bed, the baffle can be extended to the bottom of the bed with a series of openings or apertures at the bottom edge of the baffle. In this configuration, a PVC or similar pipe could be connected to each aperture in the baffle. Each pipe would then extend across the bin, so that all of the pipes would be parallel to each other. Each PVC pipe would have a series of horizontal slots on the lateral sides. These slots would extend along the length of each pipe. The chip bed would, rather than resting on the perforated plate, rest on the floor of the bin surrounding the PVC pipes. In one example embodiment, nine pipes could be utilized at the bottom of each bed. An embodiment employing perforated plates would likely be the most efficient, because the pipes tend to become clogged and require cleaning.

In still another embodiment in accordance with the invention, each of the bins could utilize multiple inlets or baffles, so that the coolant to the filters enter the bins from different locations. That is, the multiple inlets could be at opposing sides if two baffles are used. Correspondingly, a four-sided entry configuration could be utilized if four baffles or inlets are used.

Figure 8:
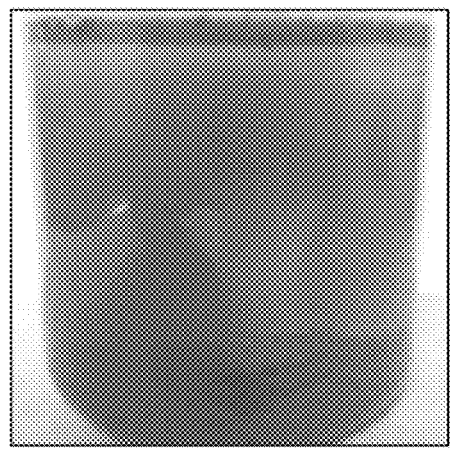
FIG. 8 is a photograph of a beaker of coolant before any filtering operations.
Figure 9:
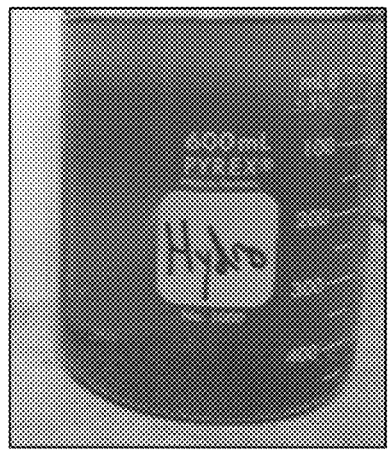
FIG. 9 is a photograph of a beaker having coolant which has passed through the prior art paper media system.
Figure 10:
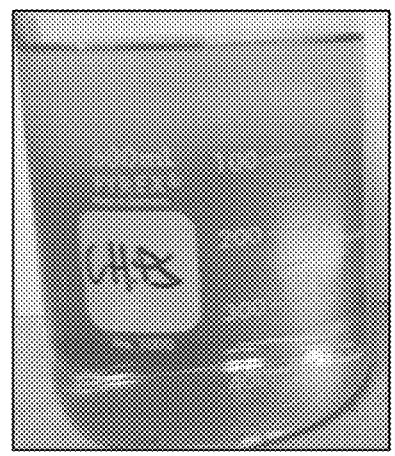
FIG. 10 is a photograph of a beaker of coolant which has passed through the chip filtering process in accordance with the invention.
Figure 12:
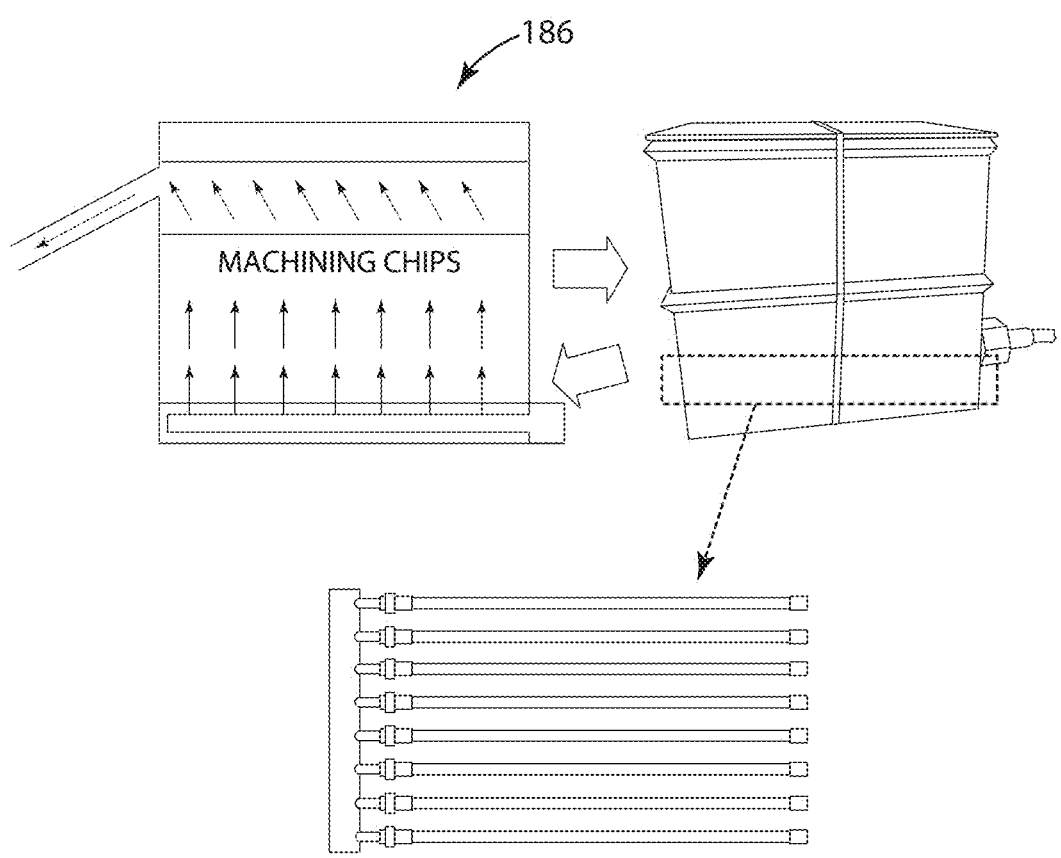
FIG. 12 is an enlarged view of the chip hopper shown in FIG. 3, and specifically illustrating the dirty coolant tank as having a dam with the dirty coolant being filtered by the chip bed as the coolant flows upwardly through the chip bed and then to a clean tank.

With respect to grinding systems in accordance with the invention, certain experimental activities have been undertaken. FIG. 8 illustrates a beaker of dirty coolant before any type of filtering. FIG. 9 illustrates the beaker of coolant following cleaning through the use of paper media as shown in the prior art system described herein. Correspondingly, FIG. 10 is a beaker of coolant which has been cleaned using the chip filtering system in accordance with the invention. FIG. 11 illustrates a dirt load analysis. The analysis shows a dirt particle following use of the paper media prior art system. Correspondingly, FIG. 11 also advantageously shows the dirt particle following cleaning through the chip filtration system. Still further, FIG. 12 is a somewhat enlarged view of one of the bins 186 which may be utilized in accordance with the invention.

Figure 13:
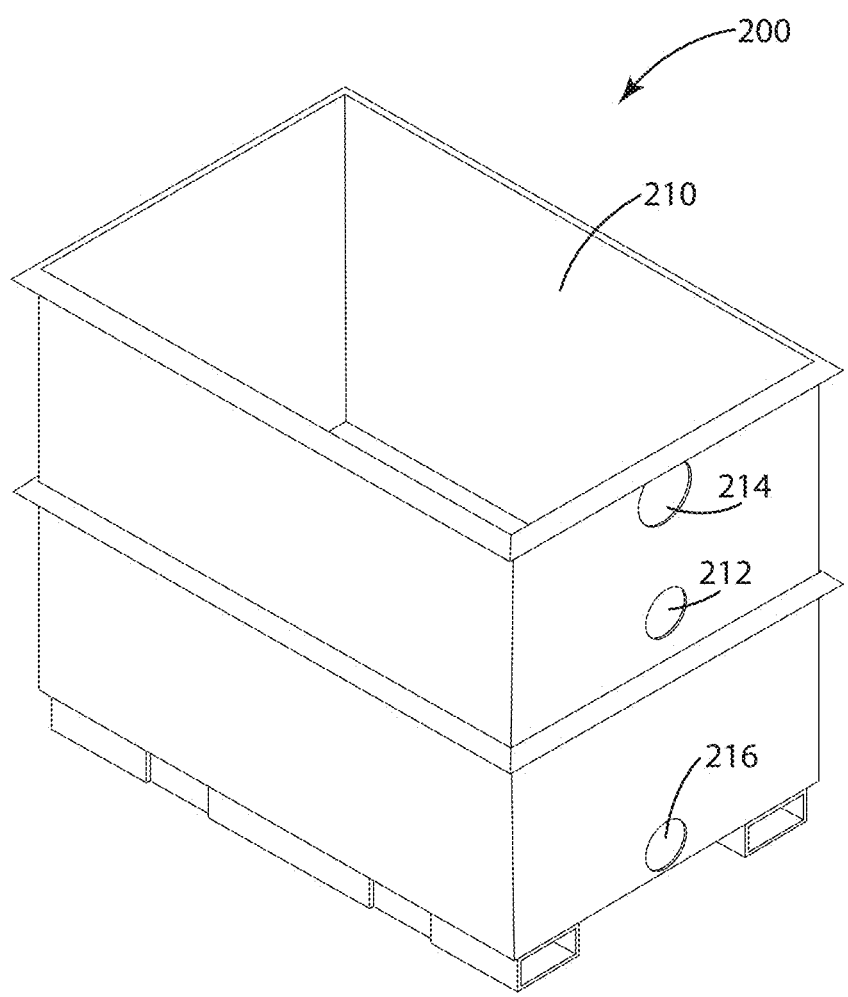
FIG. 13 is a perspective view of an embodiment of a filtration system.
Figure 14:
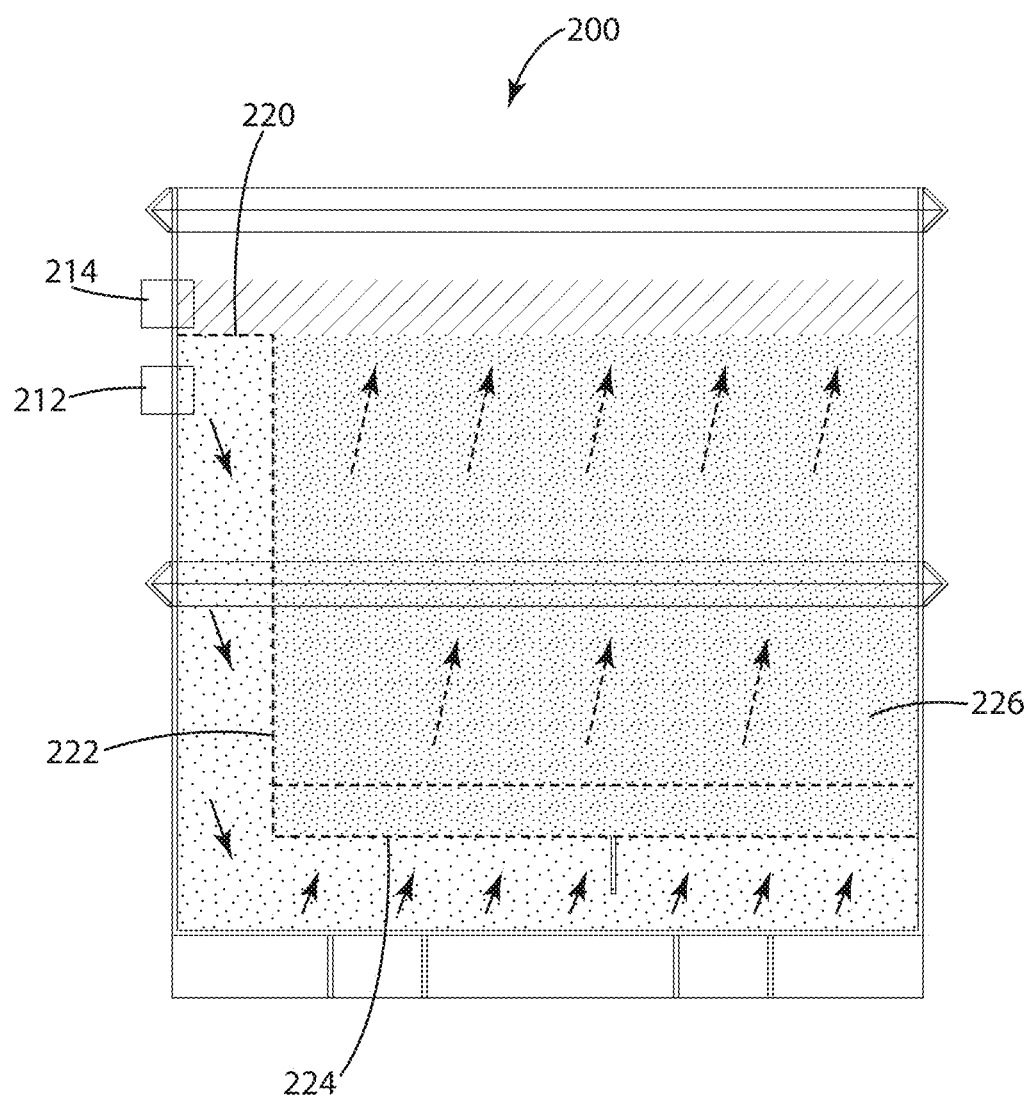
FIG. 14 is a side cutaway view of an embodiment of a filtration system.

FIGS. 13 and 14 illustrate an embodiment of the coolant filtration system 200. The system may receive dirty or contaminated coolant from any appropriate source, such as a dirty coolant tank, magnetic separator, grinder, or direction or indirectly from any other source as described above. The filtration system 200 includes a bin 210. The bin 210 includes an inlet port 212 and an outlet port 214. The inlet port 212 may be positioned below the outlet port 214, as illustrated. The bin 10 may further include a drain port 216. The drain port 216 may be located near the bottom of the bin 210 and allow drainage of all liquid contents in the bin 210.

The inlet port 212 may be configured to receive dirty or contaminated coolant, including coolant contaminated with swarf and metal scrap. A portion of the bin 210 near the inlet port 212 may be sectioned off from the remaining volume of the bin 210 to direct the incoming contaminated coolant to flow toward the bottom of the bin 210. For example, the bin 210 may include a top wall 220 and a baffle 222 to section off the inlet area. The top wall 220 may prevent coolant above the inlet port 212 from mixing with the incoming contaminated coolant and the baffle 222 may prevent coolant within the bin 210 from mixing with the incoming contaminated coolant. The incoming coolant may flow along the path shown by the arrows in FIG. 14 to the bottom of the bin 210.

A plate 224 may be positioned a distance above the bottom of the bin 210 and may extend up to the baffle 222. As described above, the plate 224 may be perforated to allow for coolant to pass from underneath the plate 224 up to the top of the bin 210. The plate 224 may rests on angle irons and be sealed at its sides with standard sealing foam. The coolant under the plate 224 may be drawn up as coolant exits the bin 210 from the top, as shown by the arrows in FIG. 14. As the coolant is drawn through the chips 226, the swarf and contamination may be removed and clean coolant may flow from the top of the bin 210 out of the outlet port 214. The coolant may then be reused, in any appropriate system, as described above.

It will be appreciated that the filtration system 200 may include any number of bins 210 to filter contaminated coolant and connected in any appropriate configuration, including those described above and illustrated in the Figures.

A stack of metal turnings or chips 226 may rest on the plate 224. The chips 226 may include a plurality of small metal waste and turnings and may grow in size as swarf and other metal is filtered from the contaminated coolant. Excess chips 226 may be removed from the bin 210 as needed to maintain the appropriate level for desired filtration. The chips 226 may rest on the plate 224 but not fall through. The chips 226 may be porous in aggregate to allow fluid to pass through.

With respect to other specifications associated with example embodiments which have been developed for experimental processes, the magnetic separator used in the embodiments is manufactured by Eriez, Model: C58-35 coolant cleaner, Style No. 936290, Serial No. 230156.

A number of advantages related to filtration systems in accordance with the invention have previously been described. In particular, improved filtration systems in accordance with the invention cause relatively fewer safety concerns. This occurs because the metallic turnings or chips in the bins are simply recycled when they reach a point where "dirty" coolant reaches the top of the bins and the metallic turnings or chips are something which would in any event have to have been recycled as part of the metalworking operation. Accordingly, no additional hazard is introduced into the operation. In addition to the safety issues, there is an improved life of locators and tools, because the improved filtration systems do better jobs than the prior art paper filtration systems. Still further, lower costs occur because the paper media are minimized or substantially reduced, depending upon which particular embodiment of the invention is utilized.

It will be apparent to those skilled in the pertinent arts that other embodiments of filtration systems in accordance with the invention can be designed. That is, the principles of filtration systems in accordance with the invention are not limited to the specific embodiments described herein. Accordingly, it will be apparent to those skilled in the art that modifications and other variations of the above-described illustrative embodiments of the invention may be effected, without departing from the spirit and scope of the novel concepts of the invention.

The invention claimed is:

1. A filtration system comprising:
a bin having a base and a plurality of sidewalls connected to and extending upward from said base, the base and plurality of sidewalls defining an inner volume;
a baffle wall positioned adjacent to and spaced away from a first sidewall;
a top wall extending between a top of said baffle wall and said first sidewall;
a perforated plate extending between a bottom of said baffle wall and a second sidewall, wherein said second sidewall is opposite said first sidewall;
an inlet in said bin, said inlet positioned along said first sidewall below said top wall;
an outlet in said bin;
a plurality of metal chips positioned on said perforated plate;
wherein contaminated fluid is directed to flow from said inlet, through a space between said baffle wall and said first side wall, through said perforated plate, and exit said bin at said outlet after passing through said plurality of metal chips.

2. The filtration system of claim 1, wherein said fluid is coolant.

3. The filtration system of claim 2, wherein said contaminated fluid includes metal swarf in said coolant.

4. The filtration system of claim 1, wherein said outlet is positioned above said inlet.

5. The filtration system of claim 1, wherein said outlet is positioned above said plurality of metal chips.

6. The filtration system of claim 1, wherein contaminated fluid is directed to flow through said inlet after the contaminated fluid has passed through a magnetic separator.

* * * * *